(12) United States Patent
Vajravel

(10) Patent No.: US 10,180,853 B2
(45) Date of Patent: Jan. 15, 2019

(54) SESSION RELIABILITY FOR A REDIRECTED MASS STORAGE DEVICE

(71) Applicant: Wyse Technology L.L.C., Santa Clara, CA (US)

(72) Inventor: Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 233 days.

(21) Appl. No.: 15/144,247

(22) Filed: May 2, 2016

(65) Prior Publication Data

US 2017/0315833 A1  Nov. 2, 2017

(51) Int. Cl.
*G06F 3/06* (2006.01)
*G06F 9/455* (2018.01)
*G06F 13/42* (2006.01)
*G06F 9/451* (2018.01)

(52) U.S. Cl.
CPC ........ *G06F 9/45558* (2013.01); *G06F 3/0619* (2013.01); *G06F 3/0665* (2013.01); *G06F 3/0689* (2013.01); *G06F 9/452* (2018.02); *G06F 13/4282* (2013.01); *G06F 2009/45579* (2013.01)

(58) Field of Classification Search
CPC .. G06F 9/45558; G06F 3/0619; G06F 3/0665; G06F 3/0689; G06F 13/4282; G06F 2009/45579; G06F 2009/45583
See application file for complete search history.

(56) References Cited

U.S. PATENT DOCUMENTS

| | | | |
|---|---|---|---|
| 8,090,836 B1* | 1/2012 | Bean | G06F 9/4856 709/227 |
| 2004/0168052 A1* | 8/2004 | Clisham | H04L 63/0428 713/153 |
| 2005/0192969 A1* | 9/2005 | Haga | G06Q 10/02 |
| 2006/0193263 A1* | 8/2006 | Vanamamalai | H04L 12/16 370/241 |

\* cited by examiner

*Primary Examiner* — Henry Tsai
*Assistant Examiner* — John B Roche
(74) *Attorney, Agent, or Firm* — Kirton McConkie; Brian Tucker

(57) ABSTRACT

Session reliability for a redirected mass storage device can be improved by delaying a device removal process when a redirected mass storage device is disconnected. Whenever a session employed to redirect a mass storage device is disconnected, the agent on the server can send a device removal notification to a virtual disk enumerator. Rather than immediately initiating the device removal process, the virtual disk enumerator can pause I/O requests pertaining to the mass storage device and wait a specified amount of time to allow the mass storage device to be reconnected. If the mass storage device is reconnected during the specified amount of time, the paused I/O requests can be resumed. Otherwise, the device removal process can be commenced after the specified amount of time has elapsed.

20 Claims, 17 Drawing Sheets

800

801

Receive, From An Agent That Executes On The Server, One Or More Device Removal Notifications That Each Identify A Mass Storage Device That Had Been Redirected To The Server Over A Remote Session But That Has Been Disconnected, At Least One Of The One Or More Device Removal Notifications Including An Indication That A Server Link Is Down

802

Instruct A Port Driver That Executes On The Server To Pause All I/O Requests

803

Wait For A Specified Amount Of Time To Determine Whether The Server Link Has Been Reestablished Such That: Upon Determining That The Link Has Been Reestablished Prior To The Specified Amount Of Time Elapsing, The Virtual Disk Enumerator: Identifies Any Disconnected Mass Storage Device That Has Not Been Reconnected And Commences A Device Removal Process To Remove Each Identified Mass Storage Device From The Server Including To Cause Any I/O Requests Pertaining To An Identified Mass Storage Device To Be Completed With An Error Status; And Instructs The Port Driver To Resume The Paused I/O Requests; And Upon Determining That The Link Has Not Been Reestablished Prior To The Specified Amount Of Time Elapsing, The Virtual Disk Enumerator Commences A Device Removal Process To Remove Each Of The Disconnected Mass Storage Devices

*FIG. 8*

SESSION RELIABILITY FOR A REDIRECTED MASS STORAGE DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands Together, these aspects allow the user at client 102 to locally view and input commands to the desktop and/or application that is running remotely on server 104. From the perspective of the client side, the desktop running on server 104 may represent a virtual desktop environment.

Windows I/O uses a layered architecture where device drivers are on a device stack. In a basic model, the top of the stack is the file system. Next is the volume manager, followed by the disk driver. At the bottom of the device stack are the port and miniport drivers. When an I/O request reaches the file system, it takes the block number of the file and translates it to an offset in the volume. The volume manager then translates the volume offset to a block number on the disk and passes the request to the disk driver. When the request reaches the disk driver it will create a Command Descriptor Block (CDB) that will be sent to the SCSI device. The disk driver imbeds the CDB into a structure called the SCSI_REQUEST_BLOCK (SRB). This SRB is sent to the port driver as part of the I/O request packet (IRP).

The port driver does most of the request processing including providing timing services for requests, enforcing queue depth (making sure that a device does not get more requests that it can handle), and building scatter gather arrays for data buffers. The port driver interfaces with a driver called the miniport. The miniport driver is designed by the hardware manufacturer to work with a specific adapter and is responsible for taking requests from the port driver and sending them to the target logical unit number (LUN). The port driver calls the HwStorStartIo( )function to send requests to the miniport, and the miniport will send the requests to the LUN. When the request is complete, the miniport will call StorPortNotification( )with the NotificationType parameter value set to RequestComplete, along with a pointer to the completed SRB.

When a request is sent to the miniport, the port driver will put the request in a pending queue. When the request is completed, it is removed from this queue. While requests are in the pending queue they are timed. There is one timer per logical unit and it is initialized to −1. When the first request is sent to the miniport the timer is set to the timeout value in the SRB.

The timer is decremented once per second. When a request completes, the timer is refreshed with the timeout value of the head request in the pending queue. So, as long as requests complete the timer will never go to zero. If the timer does go to zero, it means the device has stopped responding. In response, the port driver logs an error and takes corrective action by trying to reset the unit. When the unit is reset, all outstanding requests are completed with an error and they are retried. When the pending queue empties, the timer is set to −1 which is its initial value.

FIG. 2 is a block diagram of a virtual device infrastructure (VDI) environment 200 which can implement this type of functionality when a USB mass storage device is redirected from a client 102 to a server 104 over a remote session. As shown, while client 102 has established a remote session with server 104, a USB mass storage device 240 is connected to client 102. In accordance with embodiments of the present invention, client 102 can be configured to redirect device 240 over the remote session so that the device is accessible on server 104. Proxy 210 on client 102 and agent 250 on server 104 can be configured to establish and maintain the remote session to enable this redirection.

FIG. 2 provides a general overview of the primary components that can be employed to redirect mass storage device 240 at the disk level. This technique can be referred to as disk level redirection and is distinguished from general USB redirection in that the redirection occurs at the disk level rather than at the USB device level. In particular, client 102 can include a disk driver stack 220 that includes a disk driver 220a, a USB storage driver 220b, and a USB hub driver 220c. As is known in the art, USB storage driver 220b and USB hub driver 220c can implement the USB protocol to enable communication with device 240 as a USB mass storage device. Disk driver 220a, which in some embodiments may be an instance of the disk.sys process, can function to service read/write requests and to abstract the underlying USB storage and hub drivers 220b, 220c.

On the server side, a corresponding disk driver 282, which may be another instance of the disk.sys process, may sit below a file system stack 280 to receive and convert file system requests to disk requests (e.g., by creating a CDB and embedding it in an SRB) and to pass these disk requests (e.g., IRPs and associated SRBs) to a virtual disk enumerator 260 at the bottom of the device stack. It is noted that a volume manager is not shown in this figure for simplicity. Virtual disk enumerator 260 functions to virtualize mass storage device 240 on server 104 (as represented by virtual mass storage device 290). This virtualization is accomplished by routing the disk requests to agent 250 which will forward them over the remote session to proxy 210, down through disk driver stack 220, and to mass storage device 240 where they can be fulfilled. Corresponding responses can then be routed in a reverse direction towards virtual disk enumerator 260 and up through disk driver 282, file system stack 280, operating system 170, and ultimately to an application 270 that originated the request.

Virtual disk enumerator 260 can implement the port driver and miniport driver functionality described above. In particular, virtual disk enumerator 260 can implement the timer functionality for determining when an SRB has timed out, and, when a timeout occurs, can implement functionality to retry the outstanding requests.

One problem that exists when a mass storage device is redirected over a high latency network such as the internet is that the remote session can be disconnected briefly due to various factors such as congestion, high latency, packet loss, etc. Such temporary disconnections can be a result of client-side or server-side disturbances. When a brief disconnection occurs, the agent and proxy can restore the remote session so that the impact on the user experience is minimized However, during such disconnections, including very brief disconnections, a redirected device will be disconnected from the server. If the redirected device is a mass storage device this disconnection can substantially disrupt the user experience. For example, if the user was in the process of copying a file from a redirected mass storage device to the server when a brief session disconnection occurs, the mass storage device will be disconnected from the server resulting in any progress being lost. When the session is restored, the mass storage device will be reconnected. However, the copying process will have to be restarted. Therefore, if 95% of a 10 MB file had been copied prior to the disconnection, the 9.5 MB of the file that had already been copied will have to again be copied. Accordingly, even if the session is seamlessly reestablished after a disconnection, it will still appear to the user that the copying of the file is taking a long time to complete.

BRIEF SUMMARY

The present invention extends to methods, systems, and computer program products for improving session reliability for a redirected mass storage device when a redirected mass storage device is disconnected. Whenever a session employed to redirect a mass storage device is disconnected, the agent on the server can send a device removal notification to a virtual disk enumerator. Rather than immediately initiating the device removal process, the virtual disk enumerator can pause I/O requests pertaining to the mass storage device and wait a specified amount of time to allow the mass storage device to be reconnected. If the mass storage device is reconnected during the specified amount of time, the paused I/O requests can be resumed. Otherwise, the device removal process can be commenced after the specified amount of time has elapsed.

In one embodiment, the present invention is implemented in a virtual desktop infrastructure environment as a method for improving session reliability for a redirected mass storage device. A virtual disk enumerator can receive a device removal notification that identifies a mass storage device that had been redirected to the server over a remote session but that has been disconnected. The virtual disk enumerator can then instruct a port driver to pause any I/O requests pertaining to the mass storage device and wait for a specified amount of time to determine whether the mass storage device has been reconnected. Upon determining that the mass storage device has been reconnected prior to the specified amount of time elapsing, the virtual disk enumerator can instruct the port driver to resume any I/O requests pertaining to the mass storage device. In contrast, upon determining that the mass storage device has not been reconnected prior to the specified amount of time elapsing, the virtual disk enumerator can commence a device removal process to remove the mass storage device from the server.

In another embodiment, the present invention is implemented in a virtual desktop infrastructure environment as a method for improving session reliability for a redirected mass storage device. A virtual disk enumerator receives one or more device removal notifications that each identify a mass storage device that had been redirected to the server over a remote session but that has been disconnected. At least one of the one or more device removal notifications includes an indication that a server link is down. The virtual disk enumerator can then instruct a port driver that executes on the server to pause all I/O requests and wait for a specified amount of time to determine whether the server link has been reestablished. Upon determining that the link has been reestablished prior to the specified amount of time elapsing, the virtual disk enumerator identifies any disconnected mass storage device that has not been reconnected and commences a device removal process to remove each identified mass storage device from the server including to cause any I/O requests pertaining to an identified mass storage device to be completed with an error status, and instructs the port driver to resume the paused I/O requests. In contrast, upon determining that the link has not been reestablished prior to the specified amount of time elapsing, the virtual disk enumerator commences a device removal process to remove each of the disconnected mass storage devices.

In another embodiment, the present invention can be implemented as a virtual desktop infrastructure server that includes an agent that is configured to establish remote sessions with client devices including to implement redirection of mass storage devices over the remote sessions, and a virtual disk enumerator that is configured to delay a device removal process when the virtual disk enumerator receives a device removal notification from the agent by performing the following: upon receiving a device removal notification in response to a redirected mass storage device being disconnected from the server, notifying a port driver to pause I/O requests; waiting a specified period of time to allow the disconnected mass storage device to be reconnected; and upon determining that the disconnected mass storage device has been reconnected during the specified amount of time, instructing the port driver to resume the paused I/O requests.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 8 illustrates a flowchart of another example method for improving session reliability for a redirected mass storage device.

DETAILED DESCRIPTION

The present invention can be implemented as part of a virtual desktop infrastructure (VDI) environment to improve session reliability when a mass storage device is redirected over a remote session. A remote session can be established using any remoting protocol including, for example, Microsoft's Remote Desktop Protocol (RDP), Citrix's Independent Computing Architecture (ICA), VMWare's PC-over-IP (PCoIP), Dell's vWorkspace (EOP), etc. As described in the background, a mass storage device can be redirected for use on the server within a remote session. In this specification, this will be referred to as redirecting a mass storage device over a remote session. A remote session can be disconnected for any reason, including intentional and unintentional reasons. Regardless of the reason, when a session is disconnected, the mass storage device will no longer be redirected over the remote session. The present invention provides techniques for minimizing the impact of such disconnects on pending I/O requests to the redirected mass storage device.

Figure 1:
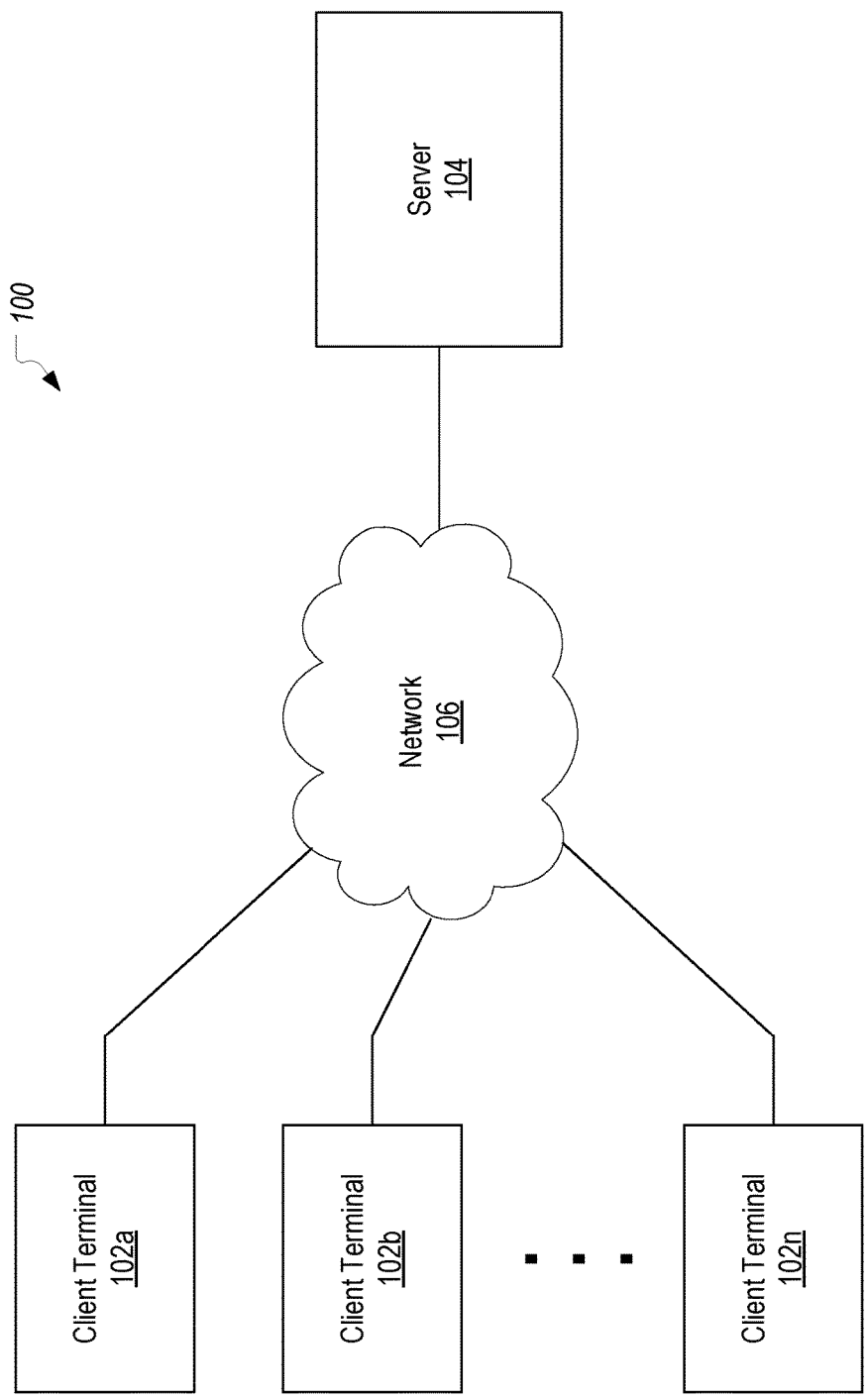
FIG. 1 illustrates an example computing environment in which the present invention can be implemented.
Figure 2:
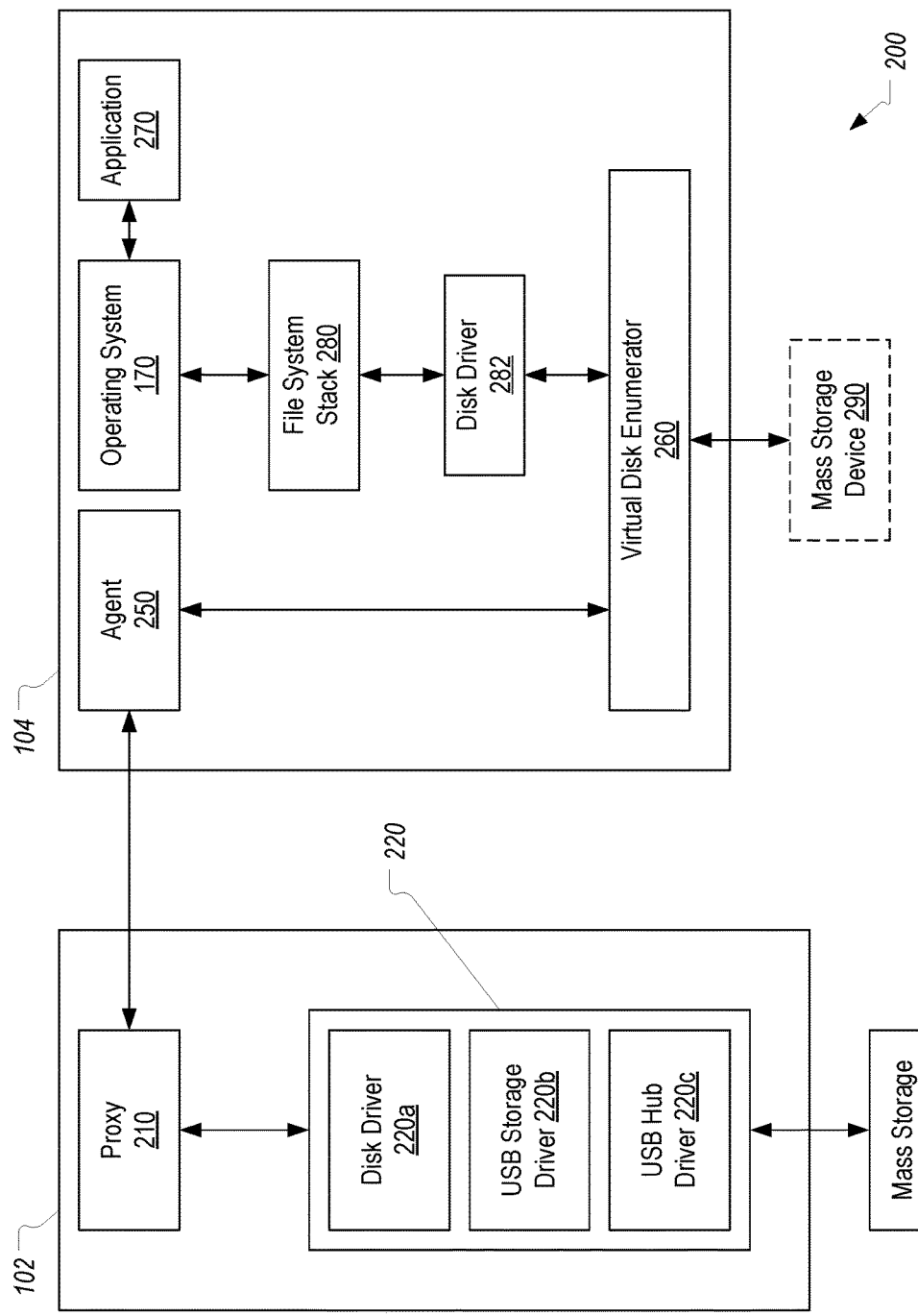
FIG. 2 illustrates how a USB mass storage device connected to a client can be redirected over a remote session to the server.
Figure 3A:
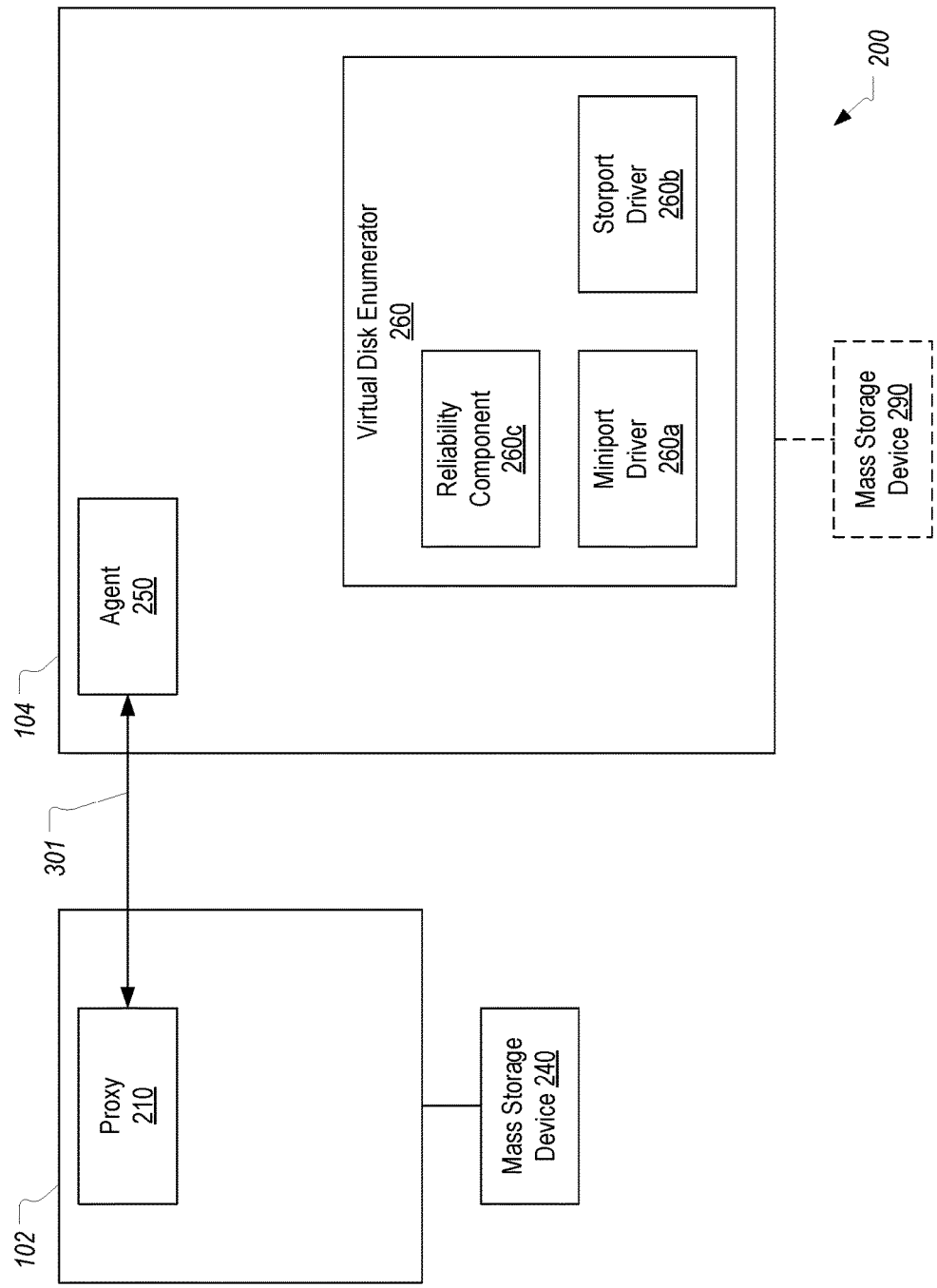
FIGS. 3A-3F illustrate an example of how a virtual disk enumerator can delay a device removal process when a redirected mass storage device is disconnected.
Figure 3B:
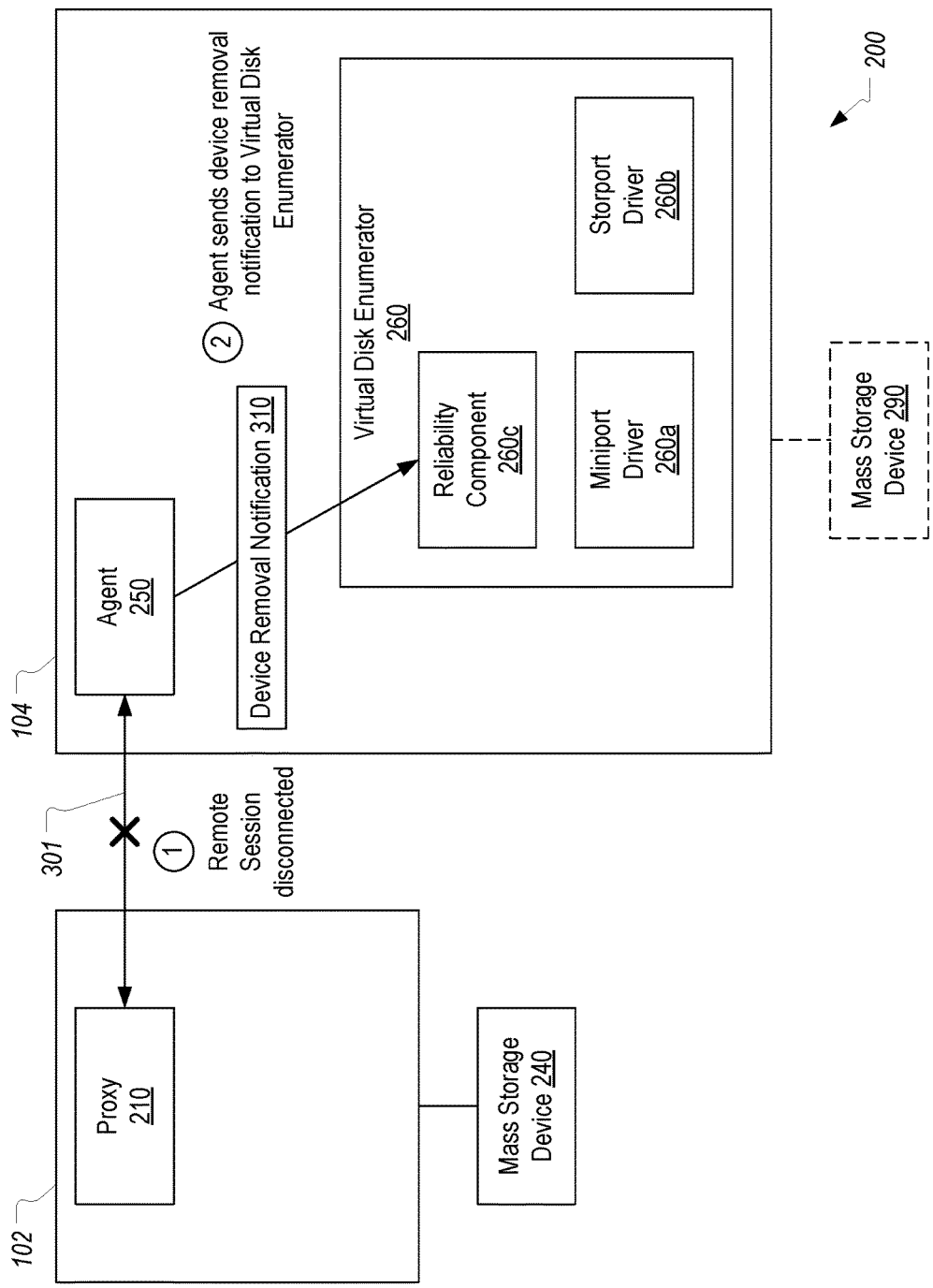

FIGS. 3A-3F illustrate how the present invention can be implemented in VDI environment 200 introduced above. For simplicity, many of the components of VDI environment 200 are not included in these figures. As shown in FIG. 3A, client 102 has established a remote session 301 with server 104. As is known in the art, proxy 210 and agent 250 can establish remote session 301 using any available remoting protocol. In FIG. 3A, it will be assumed that mass storage device 240 is being redirected over remote session 301 and therefore appears as virtual mass storage device 290 on server 104. As part of this redirection, proxy 210 will send agent 250 information about mass storage device 240 such as its disk serial number, vendor id, product id, disk size, etc. Agent 250 can associate this information with a session identifier of remote session 301. Agent 250 will send this information and the session Id to virtual disk enumerator 260 as part of a device connect request (not shown). In response, virtual disk enumerator 260 will take necessary actions to cause virtual mass storage device 290 to appear on server 104 including to assign a SCSI bus Id, a Target Id, and a Logical Unit Number (LUN) to mass storage device 240/290. Additionally, virtual disk enumerator 260 will send this additional SCSI-based information (i.e., the assigned SCSI bus Id, Target Id, and LUN) to agent 250 for association with the other information and session Id. Accordingly, after a mass storage device is successfully connected to server 104, both agent 250 and virtual disk enumerator will store (or have access to) the associated information for the mass storage device (e.g., the disk serial number, vendor id, product id, and disk size of mass storage device 240, the SCSI bus Id, Target Id, and LUN assigned to mass storage device 240, and the session Id assigned to remote session 301).

Once mass storage device 240 has been successfully connected to server 140, application 270 (or possibly any other application on server 104) can access mass storage device 240 in accordance with the techniques described in the background. For example, as explained above, virtual disk enumerator 260 can implement the miniport driver 260a and storport driver 260b so that appropriately configured I/O requests are sent over remote session 301 to mass storage device 240.

While remote session 301 is established and mass storage device 240 is being redirected to server 104, there may be any number of pending I/O requests to mass storage device 240. As described in the background, storport driver 260b can maintain a queue (not shown) for tracking these pending requests. While these I/O requests are pending, and as represented as step 1 in FIG. 3B, it is assumed that remote session 301 is disconnected for some reason. For example, client 102's or server 104's connection to the internet may be temporarily disrupted. Regardless of the reason, agent 250 will detect the disconnect, and in response, send a device removal notification 310 to virtual disk enumerator 260 in step 2, or more specifically, to a reliability component 260c of virtual disk enumerator 260. It is noted that this same type of device removal notification 310 would be sent any time mass storage device 240 was disconnected including if the user intentionally disconnected mass storage device 240 from client 102 while remote session is still established. Reliability component 260c is intended to generally represent the portion of virtual disk enumerator 260 that is tasked with performing the functionality described herein, but is not intended to reflect any actual structural division within virtual disk enumerator 260.

As explained above, agent 250 can maintain an association between the session Id of remote session 301 and the various types of information about redirected mass storage device 240. Therefore, when agent 250 detects that remote session 301 has been disconnected (or receives a notification from proxy 210 that mass storage device 240 has been physically disconnected), it can send device removal notification 310 which can include information about mass storage device 240. This information included in device removal notification 310 can include sufficient information about mass storage device 240 to allow virtual disk enumerator 260 to remove virtual mass storage device 290 from server 104 (e.g., by removing the driver stack pertaining to virtual mass storage device 290, deleting any drive letter(s) pertaining to virtual mass storage device 290, completing any pending I/O requests to mass storage device 240 with a proper error code, etc.). In some embodiments, the information included in device removal notification 310 can include the SCSI Bus Id, Target Id, and LUN assigned to mass storage device 240. In other words, the role of device removal notification 310 is to cause the appropriate actions to be taken on server 104 to remove virtual mass storage device 290 as if it were a physical device that had been physically disconnected from server 104.

Figure 3C:
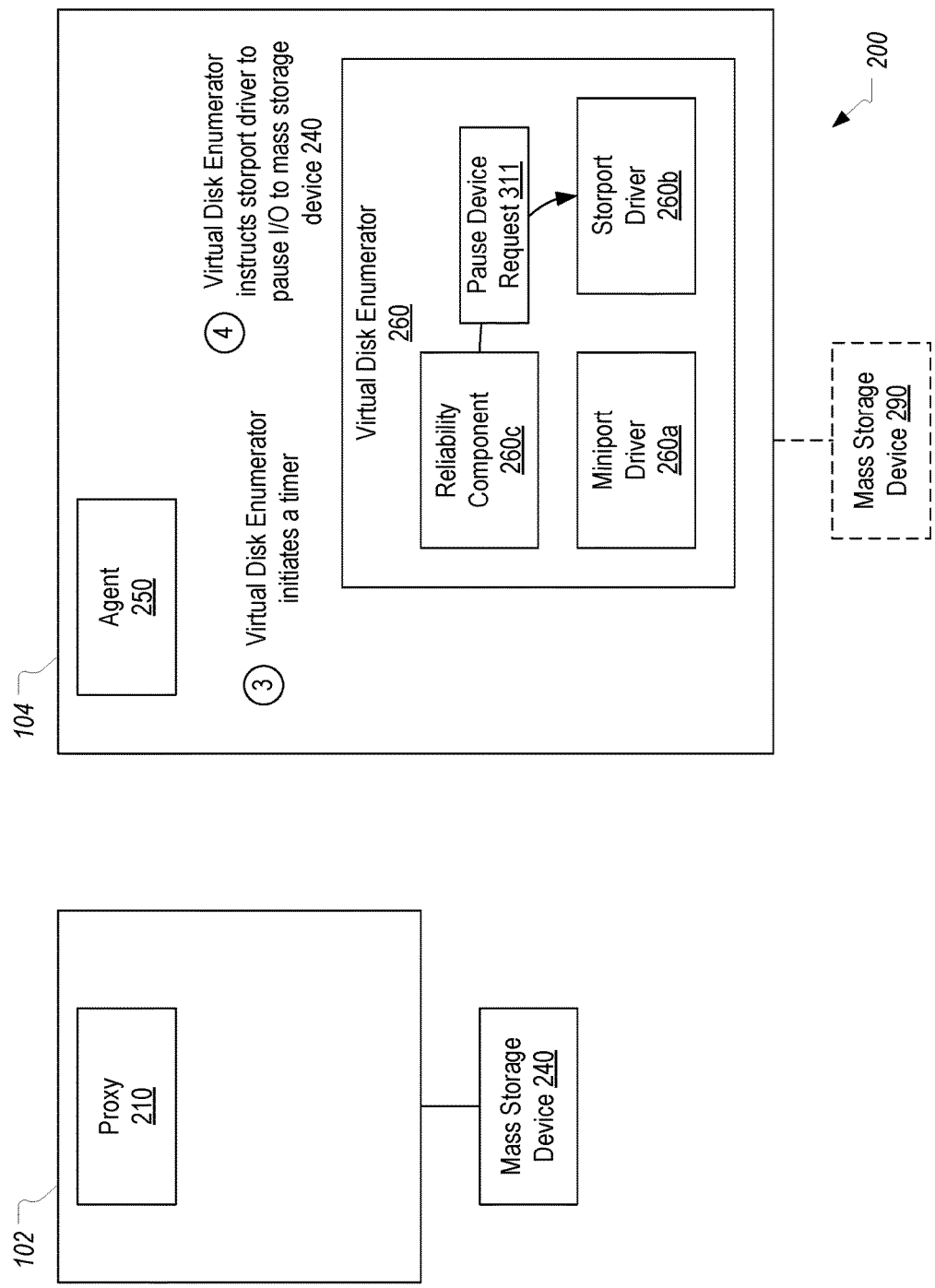

In accordance with embodiments of the present invention and as is shown in FIG. 3C, rather than taking immediate action to remove virtual mass storage device 290 from server 104, upon receiving device removal notification 310, reliability component 260c can perform two functions. As represented by step 3, reliability component 260c can initiate a timer to track how much time has elapsed since mass storage device 240 was disconnected. For example, this timer can be associated with information that uniquely identifies mass storage device 240 (e.g., its disk serial number, vendor id, product id, and/or disk size as well as the session Id of remote session 301) so that reliability component 260c can track the amount of elapsed time since mass storage device 240 was disconnected. In some embodiments, the value of the timer can be set to a session reconnection time period. This session reconnection time period is an amount of time (e.g., between 5 and 60 seconds) during which agent 250 will attempt to restore a disconnected session. After the session reconnection time period has elapsed, client 102 would be required to create a new remote session with server rather than being able to restore the disconnected remote session 301.

In conjunction with step 3, reliability component 260c can send a pause device request 311 to storport driver 260b in step 4. This pause device request 311 can specify at least some of the information that was included in device removal notification 310 to thereby allow storport driver 260b to pause any I/O requests pertaining to mass storage device 240. As an example, pause device request 311 can be performed using the StorPortPauseDevice( ) routine which includes as input parameters the SCSI Bus Id, Target Id, and LUN specified in device removal notification 310. In response to receiving pause device request 311, storport driver 260b will pause any I/O pertaining to mass storage device 240.

Figure 3D:
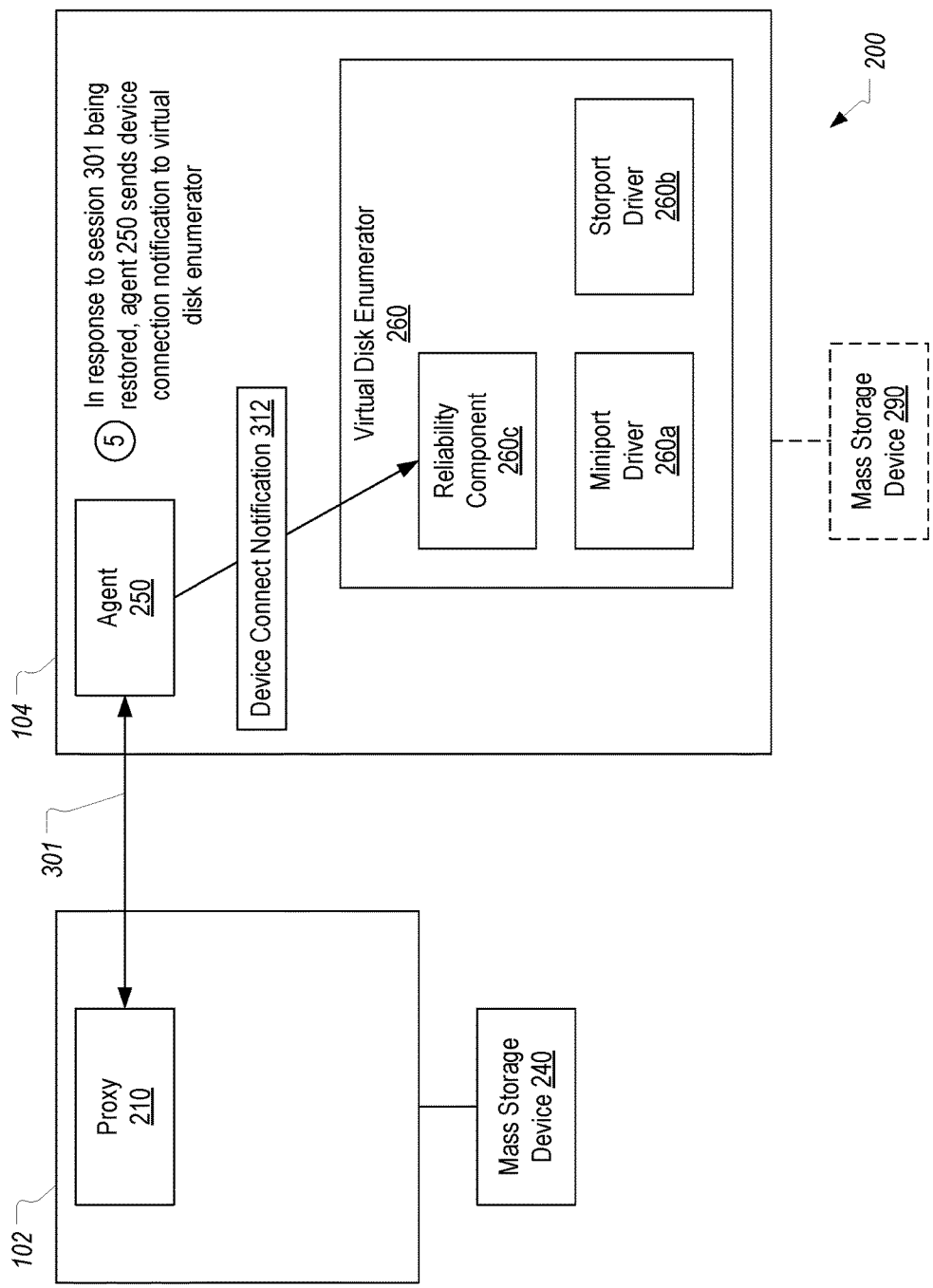

It is noted that virtual disk enumerator 260 (or, with reference to the present figures, reliability component 260c) is configured to continuously monitor for device connect and device removal notifications so that appropriate action can be taken. With regards to the present invention, prior to the timer elapsing, when reliability component 260c receives a device connect notification, it can determine whether the device connect notification pertains to a recently disconnected device thereby indicating that the device has been reconnected. For example, as represented in FIG. 3D, it is assumed that proxy 210 and agent 250 are able to restore remote session 301 (or, if the disconnect was caused by mass storage device 240 being physically disconnected from client 102, that the device has again been physically reconnected). As part of restoring remote session 301 (and assuming that mass storage device 240 is still redirected over remote session 301), agent 250 will send device connect notification 312 to reliability component 260c in step 5. As described above, device connect notification 312 can include the disk serial number, vendor id, product id, disk size, etc. of mass storage device 240 as well as the session Id for remote session 301.

Figure 3E:
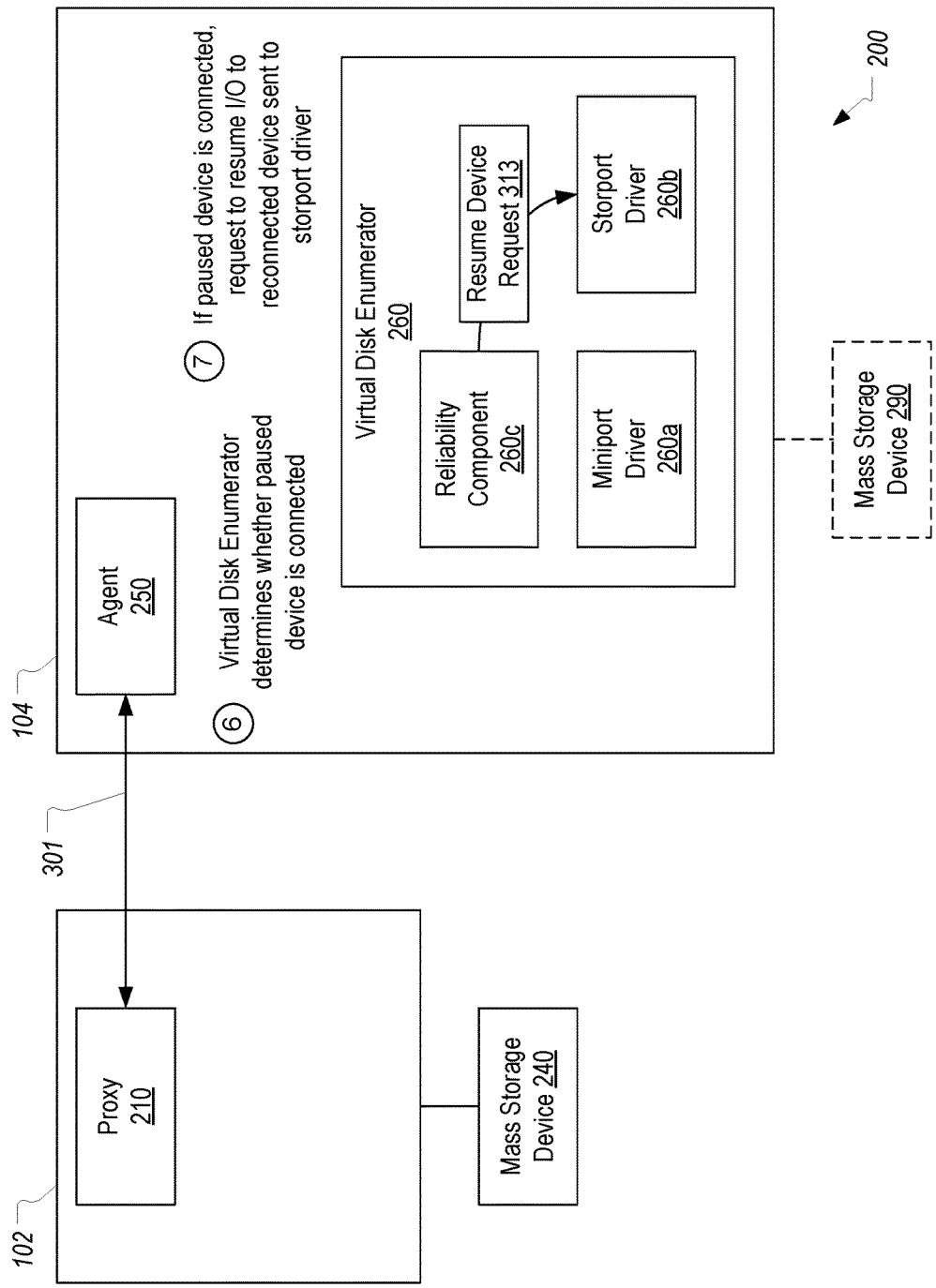

As shown in FIG. 3E, in response to receiving device connect notification 312, reliability component 260c can employ the information included within the notification to determine whether the notification pertains to a paused device. More specifically, reliability component 260c can compare the disk serial number (and possibly vendor id, product id, and/or disk size) as well as the session Id specified in device connect notification 312 to the information associated with any timer. In this example, it will be assumed that device connect notification 312 is received before the timer initiated in step 3 has elapsed. Reliability component 260c will therefore determine that mass storage device 240, which is currently paused, has been reconnected since the information specified in device connect notification 312 will match the information associated with the timer. This comparison can include the session Id to ensure that mass storage device 240 has been reconnected over the same remote session (i.e., over restored remote session 301) rather than over another remote session including a new remote session initiated by the same client.

Upon determining that mass storage device 240 has been reconnected during the specified amount of time (e.g., during the session reconnection time period), reliability component 260c can send a resume device request 313 to storport driver 260b in step 7. In some embodiments, this resume device request 313 can be performed using the StorPortResumeDevice( )routine which includes as input parameters the same SCSI Bus Id, Target Id, and LUN used previously in the call to the StorPortPauseDevice( )routine.

In response to receiving resume device request 313, storport driver 260b will resume the paused I/O pertaining to mass storage device 240. Accordingly, even though remote session 301 was disconnected and agent 250 generated a device removal notification to request the removal of mass storage device 240, reliability component 260c did not initiate the process of removing virtual mass storage device 290 from server 104. Instead, reliability component 260c delayed the device removal process by waiting to see if mass storage device 240 would be reconnected within a specified amount of time. In this way, any I/O that may have been pending when remote session 301 was disconnected can be immediately resumed. For example, if 9.5 MB of a 10 MB file had been transferred when the disconnect occurred, the I/O can be resumed so that only 0.5 MB needs to be transferred to complete the I/O as opposed to having to restart the transfer of the entire 10 MB. Therefore, from the user perspective, it may not even be apparent that remote session was temporarily disconnected.

Figure 3F:
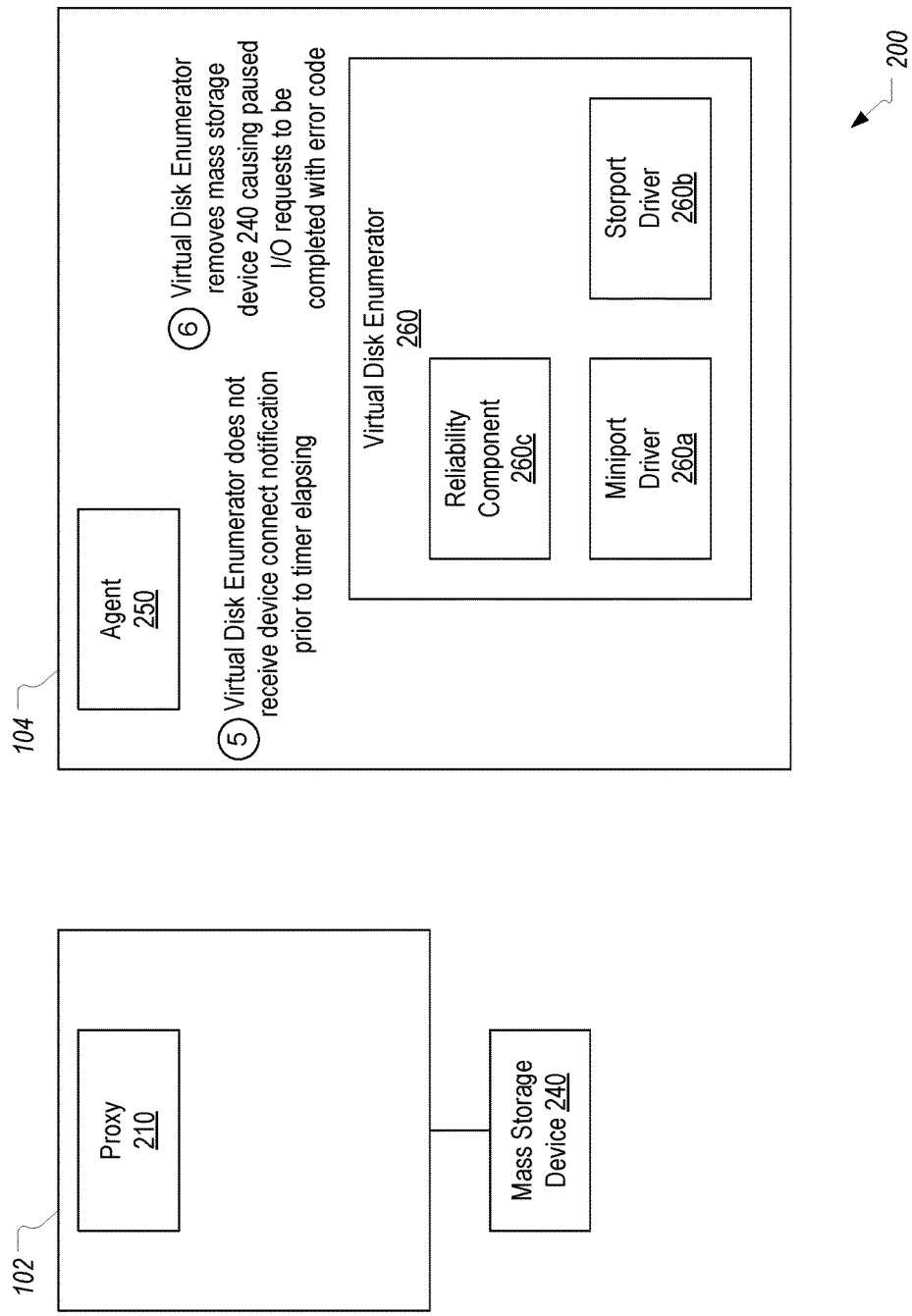

FIGS. 3D and 3E represent the case where mass storage device 240 is reconnected within the specified period of time. However, in some cases, remote session 301 may not be restored at all or within the specified period of time. In such cases, agent 250 would not generate device connect notification 312 before the timer has elapsed. FIG. 3F illustrates the actions that reliability component 260c can perform in this scenario. In an alternate step 5, reliability component 260c can detect that the timer initiated in step 3 has elapsed (i.e., that the amount of time since the disconnect has exceeded some specified threshold). In response to the timer elapsing and in an alternate step 6, reliability component 260c can initiate the device removal process to cause virtual mass storage device 290 to no longer appear on server 104. The removal of virtual mass storage device 290 can also include causing any I/O requests pertaining to mass storage device 240 (i.e., the paused I/O requests) to be completed with an appropriate error code (e.g., an error code indicating that mass storage device 240/290 is not available or not found).

To summarize, reliability component 260c can be configured to delay the device removal process for a specified amount of time so that, if the disconnected device is reconnected during this specified amount of time, the device removal process can be prevented from proceeding and any I/O requests can be resumed with minimal interruption. In this way, the user experience can be greatly increased especially when the user establishes remote sessions over a wide area network that is subject to frequent disruptions.

Figure 4:
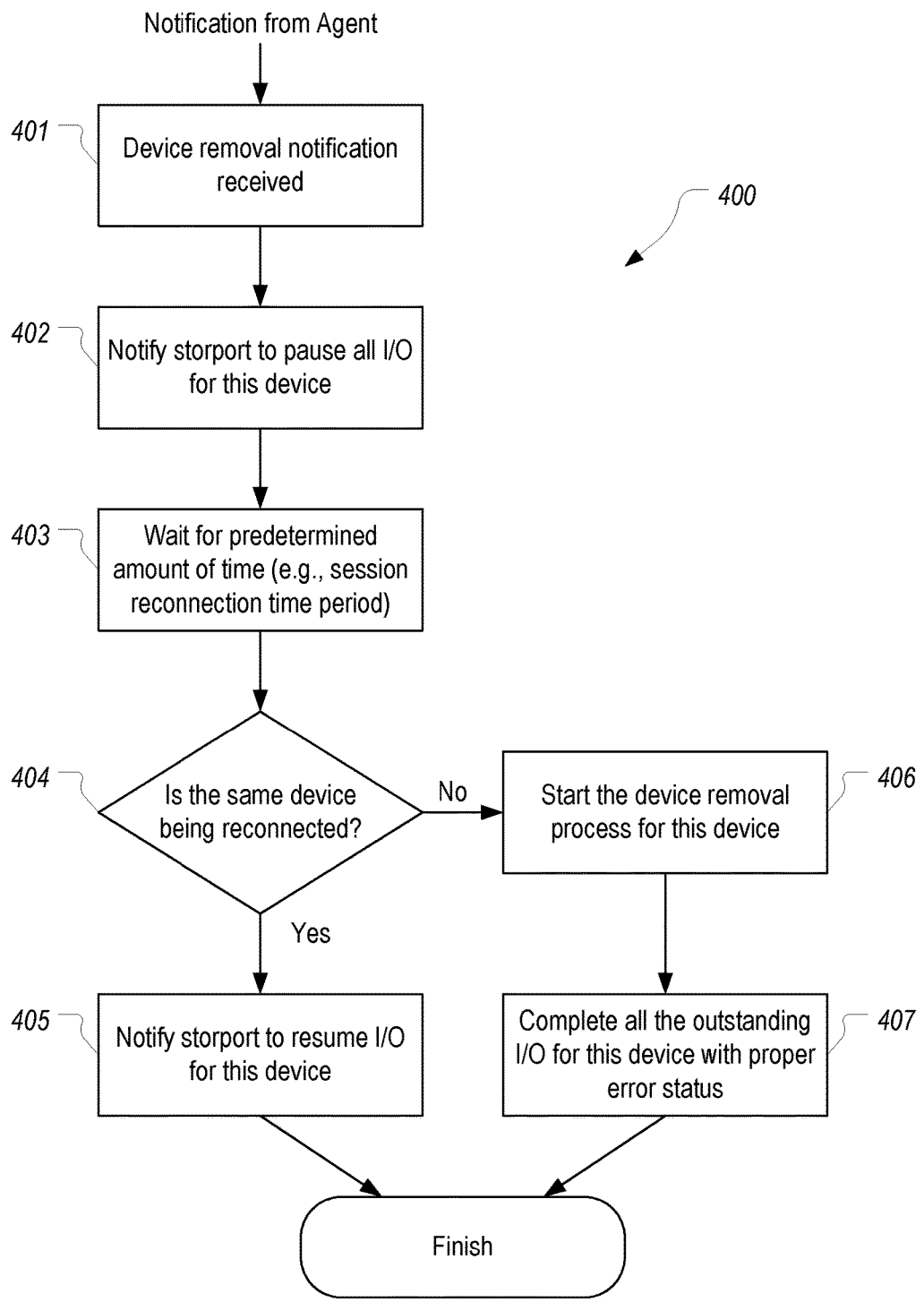
FIG. 4 provides a flowchart of the process for delaying a device removal process.

FIG. 4 provides a flow diagram of a process 400 that can be performed by a virtual disk enumerator to improve session reliability when a mass storage device is redirected. In step 401, the virtual disk enumerator receives a device removal notification from an agent. In step 402, the virtual disk enumerator uses information contained in the device removal notification to instruct the storport driver to pause all I/O for the mass storage device to which the received device removal notification pertains. In step 403, the virtual disk enumerator commences waiting for a predetermined amount of time such as, for example, the session reconnection time period. While waiting, and as represented by step 404, the virtual disk enumerator determines whether the same mass storage device has been reconnected. This determination can be based on evaluating any device connect notifications received during the predetermined amount of time (e.g., by validating a disk serial number specified in a notification against a disk serial number associated with a timer). If the same mass storage device is reconnected, then the virtual disk enumerator notifies the storport driver to resume the I/O for that device in step 405. However, if the same mass storage device is not reconnected during the predetermined amount of time, the virtual disk enumerator will start the device removal process for the device in step 406, and will complete all I/O pertaining to the device with a proper error status in step 407.

The above-described process can be implemented regardless of the reason why a remote session is disconnected. In particular, even if the source of the disruption is at the server side resulting in many remote sessions being disconnected, reliability component 260c can still perform the functionality described above for each individual mass storage device that was disconnected. However, in some embodiments, reliability component 260c may be configured to perform a slightly different process when the source of the disruption is server side. This different process, which is represented in FIGS. 5A-5E, can more efficiently handle such scenarios which will likely involve many remote sessions being disrupted.

Figure 5A:
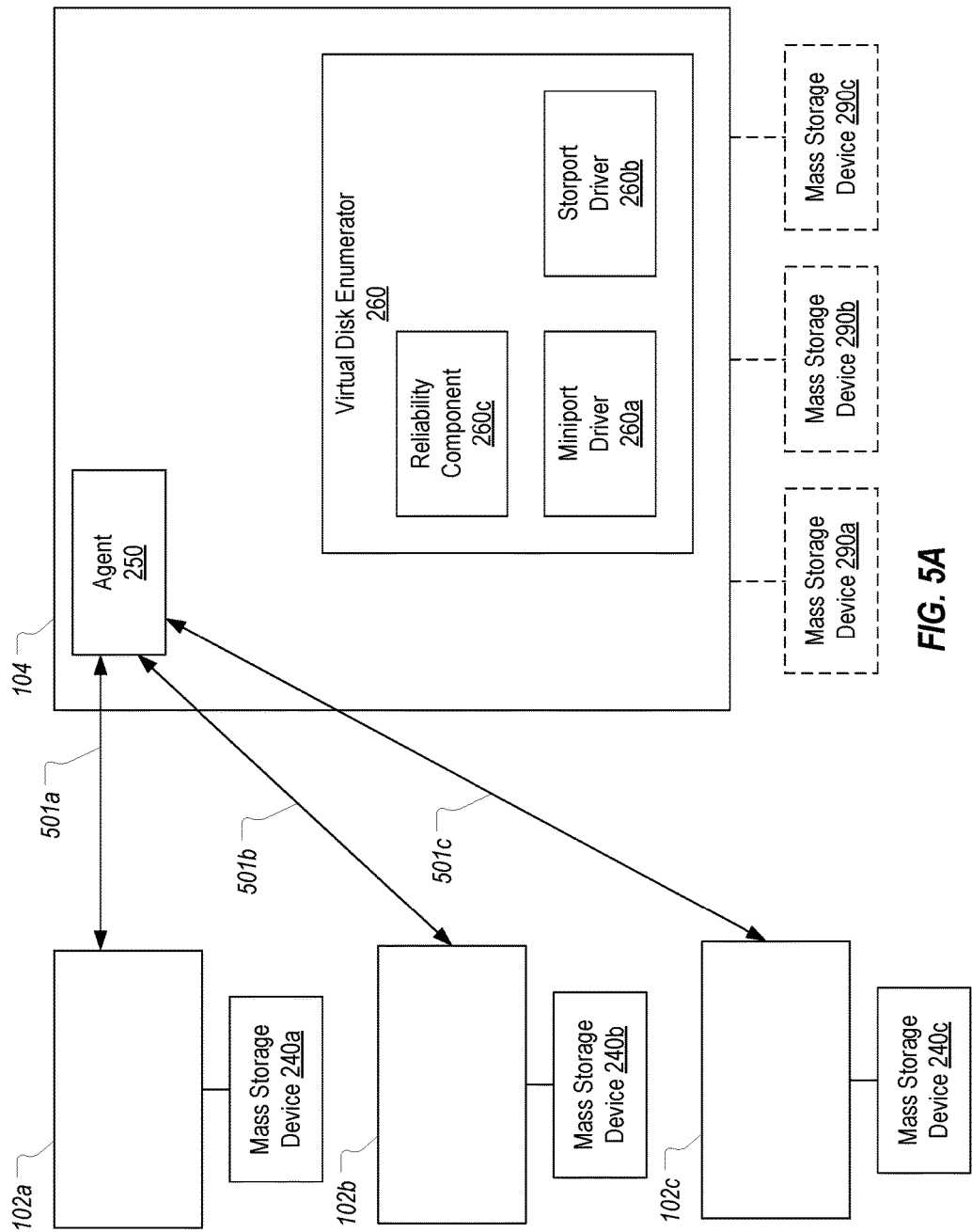
FIGS. 5A-5E illustrates another example of how a virtual disk enumerator can delay a device removal process.

FIG. 5A illustrates that a number of client devices 102a-102c have established remote sessions 501a-501c with server 104. It is assumed that mass storage devices 240a-240c coupled to client devices 102a-102c are each redirected over remote sessions 501a-501c respectively to server 104 such that virtual mass storage devices 290a-290c appear on server 104.

Figure 5B:
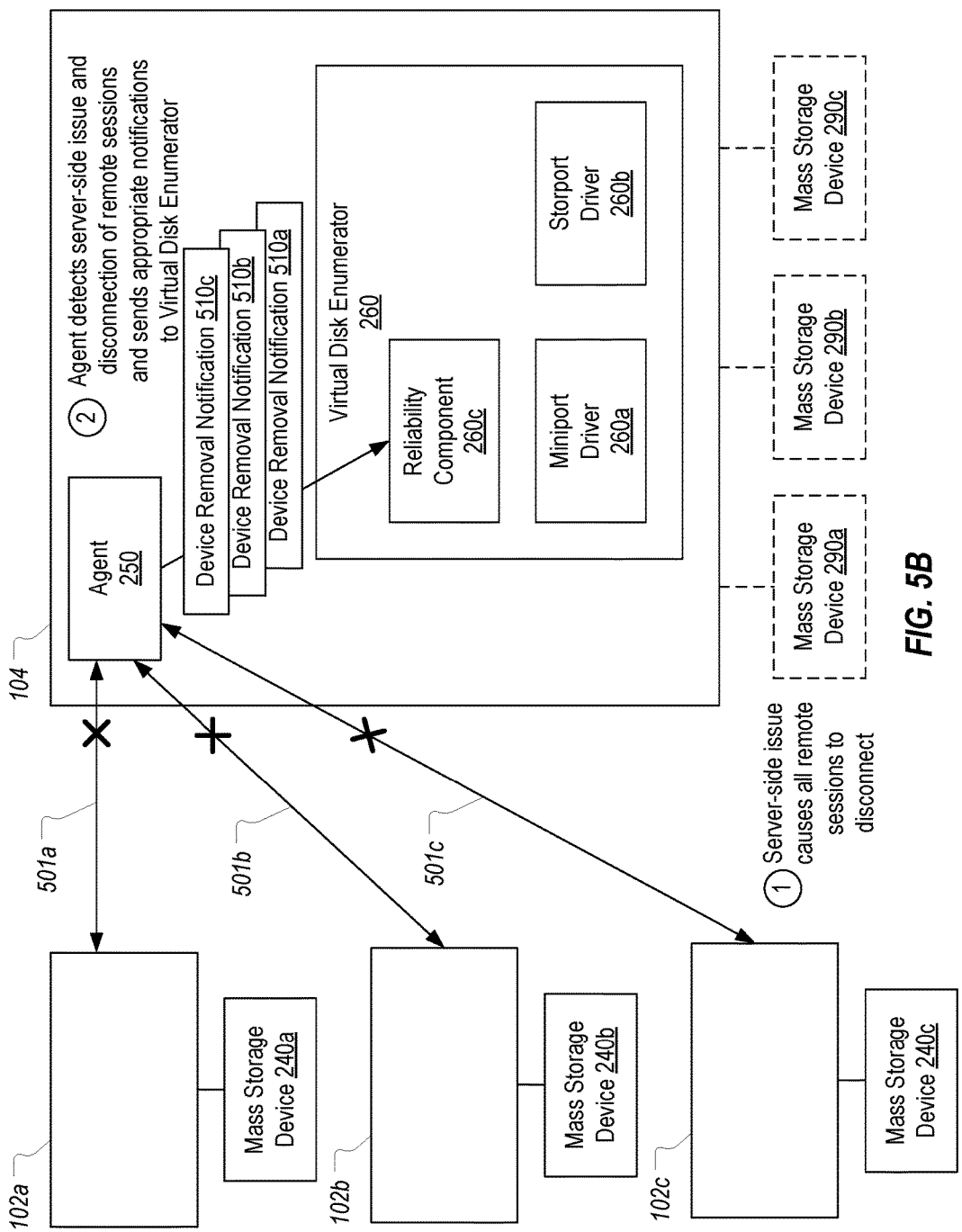

Turning to FIG. 5B, it is then assumed that some server-side issue prevents server 104 from connecting to the internet (or otherwise from maintaining remote sessions 501a-501c). In this case, because a server-side issue is causing the disruption, each of remote sessions 501a-501c will be disconnected as represented in step 1. In a similar manner as described above, agent 250 will detect the disconnection of each remote session 501a-501c and will send three device removal notifications 510a-510c corresponding to the three redirected mass storage devices 240a-240c.

Additionally, because agent 250 can be configured to monitor server 104's network components, agent 250 can also detect that a server-side issue was the reason for remote sessions 501a-501c becoming disconnected. Therefore, agent 250 can include an indication (not shown) that the link is down within each (or at least one) of device removal notifications 510a-510c. Upon receiving device removal notifications 510a-510c (which should all be received within a very short period of time since all remote sessions will be disconnected at the same time due to the server-side issue), reliability component 260c can perform similar actions as described above to delay the device removal process. However, in contrast to the process described above, because device removal notifications 510a-510c may include an indication that the server's link is down (and because reliability component 260c should have received a device removal notification for every device being redirected to the server), rather than pausing the I/O pertaining to individual devices, reliability component 260c can instead inform storport driver 260b that the link is down thereby causing storport driver 260b to pause I/O for all devices.

Figure 5C:
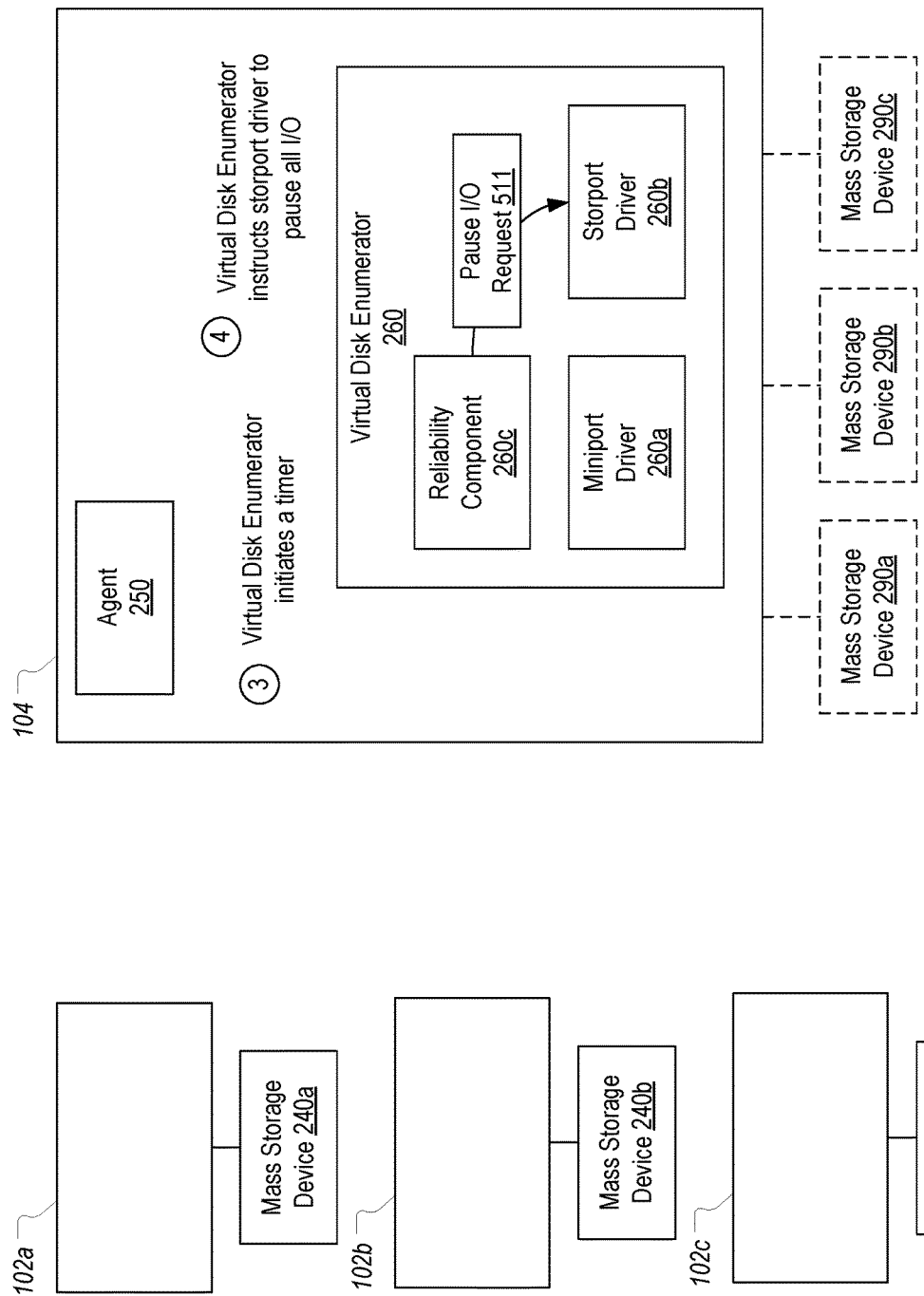

For example, as shown in FIG. 5C, in response to receiving the indication that the server's link is down, reliability component 260c can initiate a timer in step 3. This timer serves a similar purpose as described above except that it tracks how long the link has been down rather than how long any specific remote session has been disconnected. In other words, this timer can generally represent how long each of remote sessions 501a-501c has been disconnected.

In conjunction with initiating this timer, reliability component 260c can also send a pause I/O request 511 to storport driver 260b. Unlike pause device request 311, pause I/O request 511 instructs storport driver 260b to pause all I/O rather than only I/O pertaining to a particular device. In some embodiments, pause I/O request 511 can be performed by calling the StorPortNotification( )routine with "Link-Down" as the NotificationType input parameter. In response to receiving this LinkDown notification, storport driver 260b will pause all I/O.

At this point, reliability component 260c can wait for the predetermined amount of time (e.g., the session reconnection time period) to see whether the link will be reestablished. Reliability component 260c can determine that the link is reestablished in a number of different ways including by receiving one or more notifications from agent 250. For example, agent 250 could be configured to send a notification that specifically identifies that the link is up. Alternately, agent 250 could send one or more device connect notifications which can either explicitly or inherently identify that the link is up (i.e., a device connect notification would not be generated unless the link is up and therefore the generation of the notification alone implies that the link has been restored).

Figure 5D:
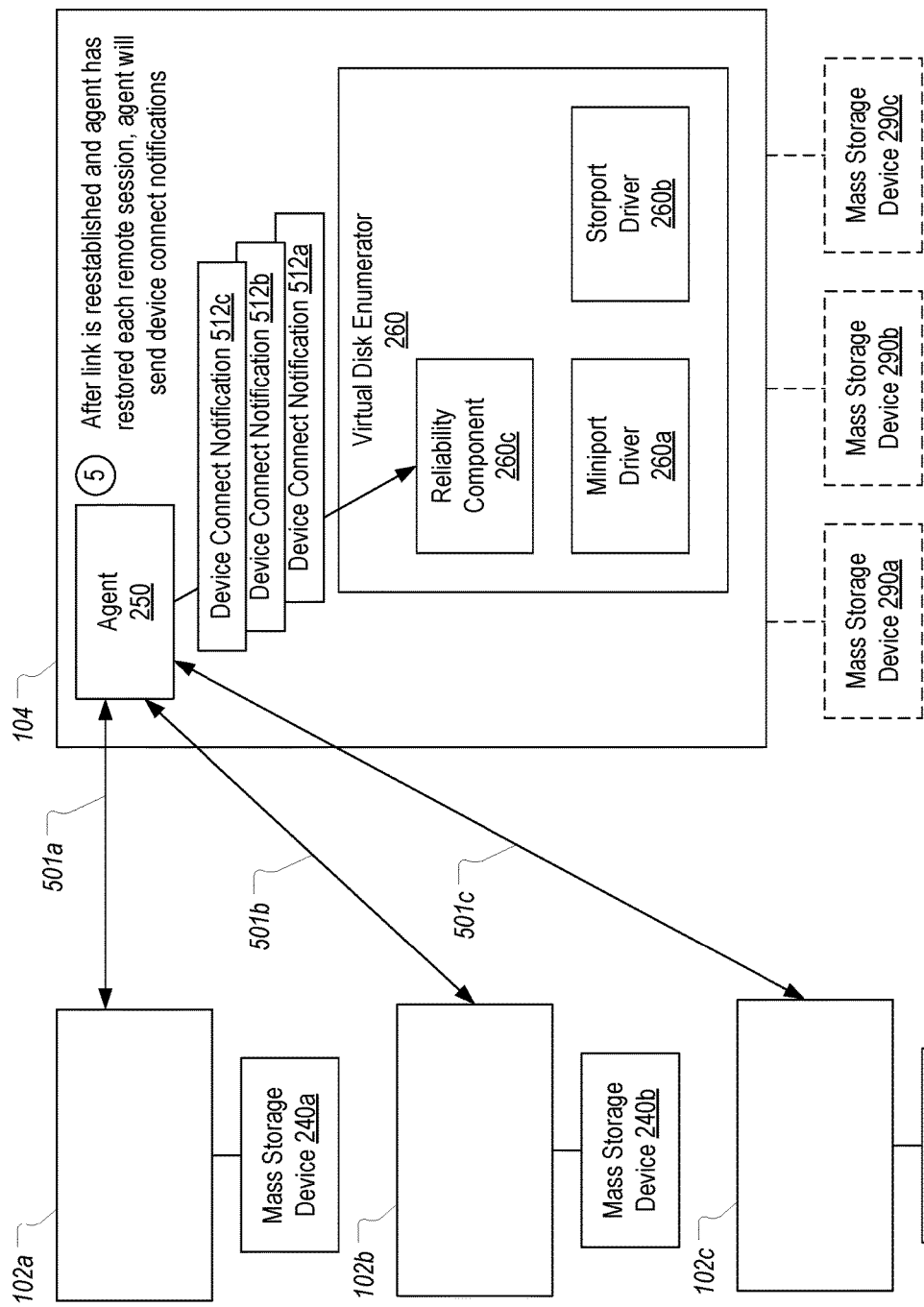

Turning to FIG. 5D, it will be assumed that the server's link is reestablished within the predetermined amount of time thereby enabling agent 250 to restore each remote session 501a-501c. As a result, agent 250 will send device connect notifications 512a-512c to reliability component 260c. After having waited until the timer has elapsed, reliability component 260c can determine whether any devices have been reconnected by evaluating any device connect notifications that have been received (e.g., device connect notifications 512a-512c). This determination can be based on the information that reliability component 260c had stored when the devices were initially redirected as described above.

Figure 5E:
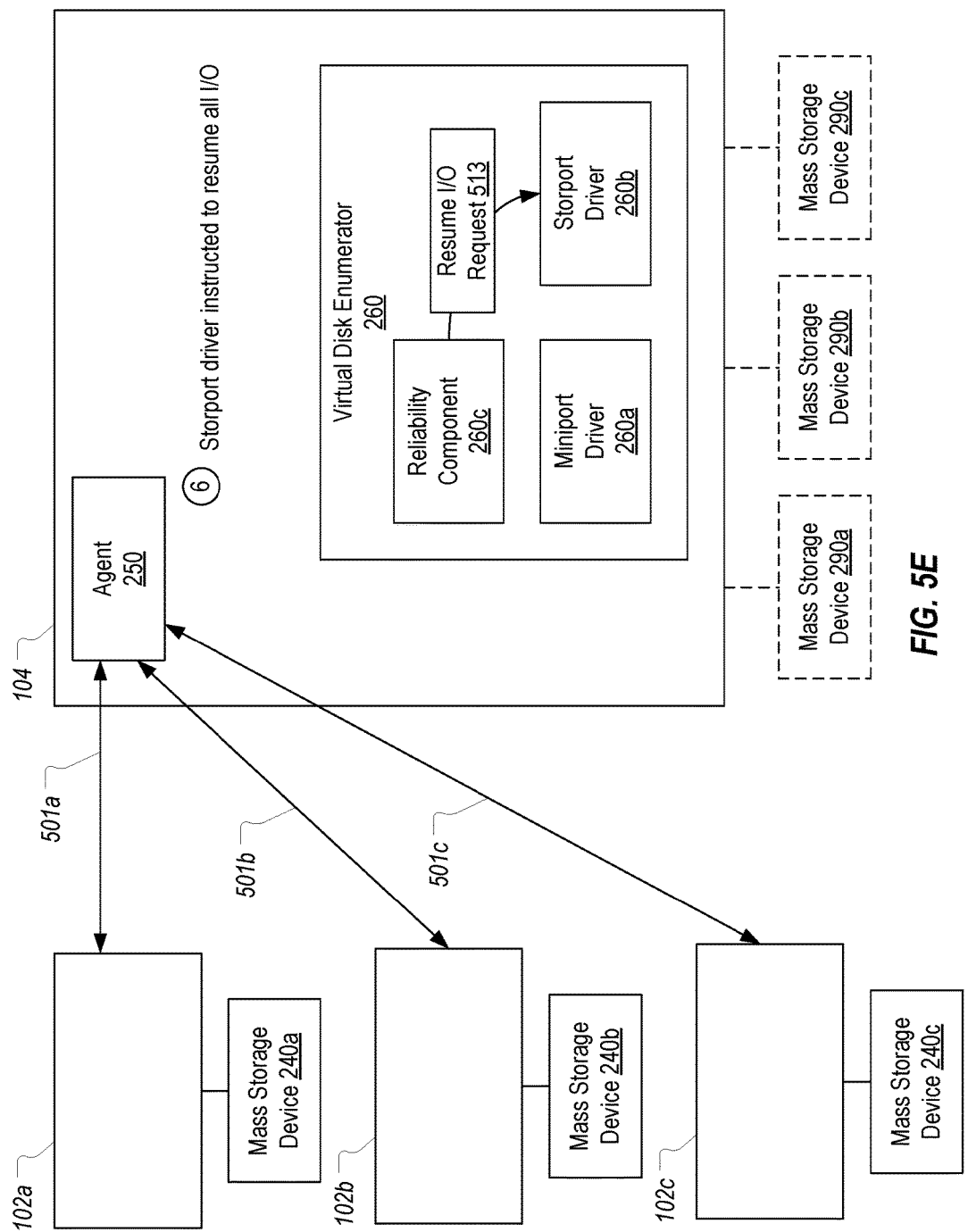

For any device that has not been reconnected (of which there are none in the depicted example), reliability component 260c can initiate the device removal process including causing all I/O pertaining to any device that was not reconnected to be completed with the proper error status. After removing each device that has not been reconnected and completing the corresponding I/O with the proper error status, reliability component 260c can send a resume I/O request 513 to storport driver 260b as shown in FIG. 5E. In some embodiments, resume I/O request 513 can be accomplished by calling the StorPortNotification( )routine with "LinkUp" as the NotificationType input parameter. In response, storport driver 260b can resume all of the paused I/O requests (which would only include the I/O requests pertaining to the reconnected devices since the I/O requests pertaining to the devices that were not reconnected will have been or will be in the process of being completed with the proper error status).

Figure 6:
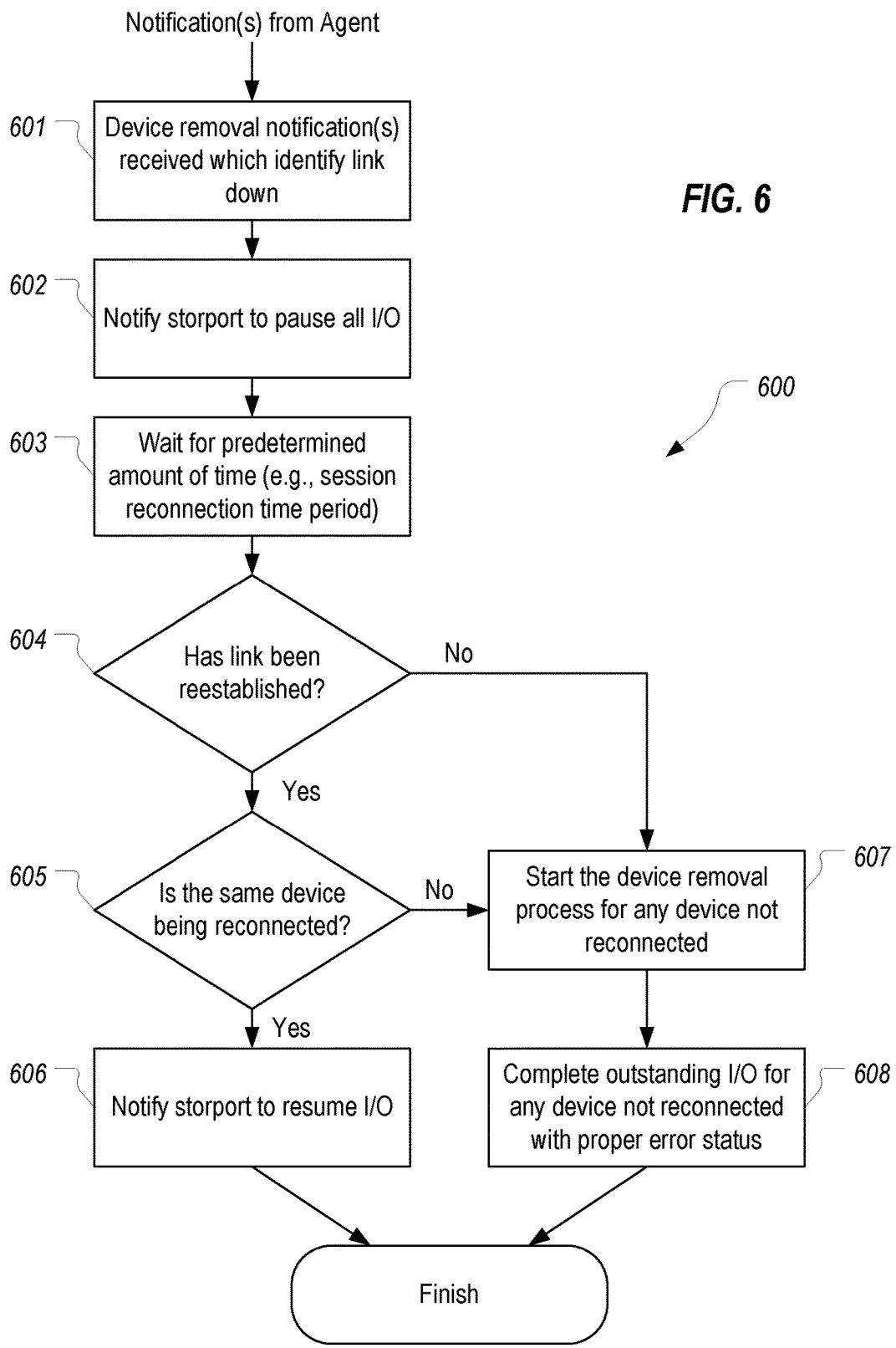
FIG. 6 provides a flowchart of another process for delaying a device removal process.

FIG. 6 provides a flowchart of a process 600 that can be performed by a virtual disk enumerator when the disconnection of one or more redirected mass storage devices is caused by a server-side issue. In step 601, the virtual disk enumerator receives one or more device removal notifications as a result of a server's link going down. At least one of the one or more received notifications can identify that the link is down. Alternatively, if a notification is received for all currently redirected devices, the virtual disk enumerator could infer that the link is down.

In step 602, and in response to being notified or determining that the link is down, the virtual disk enumerator can instruct the storport driver to pause all I/O. In conjunction with pausing all I/O, the virtual disk enumerator can commence waiting for a predetermined amount of time in step 603. While waiting, and in step 604, the virtual disk enumerator can determine whether the server's link has been established. If the link is not restored during the predetermined amount of time, the virtual disk enumerator can commence the device removal process for all of the disconnected devices in step 607 including completing all outstanding I/O with the proper error status in step 608. However, if the link is restored during the predetermined amount of time, the virtual disk enumerator can then determine which devices have been reconnected in step 605. For any device that is not reconnected (i.e., for any device for which a device connect notification was not received during the predetermined amount of time), the virtual disk enumerator can start the device removal process in step 607 including completing outstanding I/O pertaining to that device with the proper error status in step 608.

Finally, if the link was restored in time and once the virtual disk enumerator has identified which devices, if any, were not reconnected, the virtual disk enumerator can instruct the storport driver to resume I/O in step 606. Because I/O pertaining to devices that were not reconnected will have been completed with an error code at this point, only the I/O pertaining to the reconnected devices should be resumed.

Figure 7:
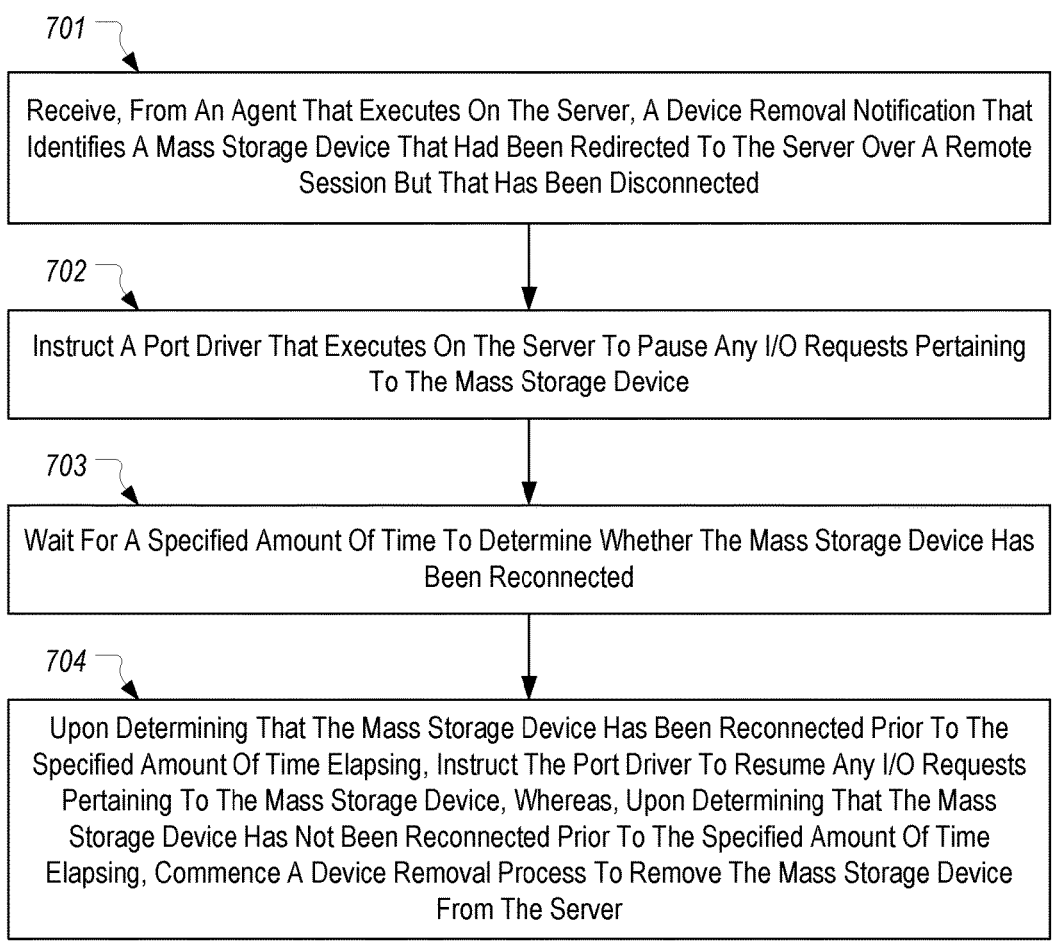
FIG. 7 illustrates a flowchart of an example method for improving session reliability for a redirected mass storage device.

FIG. 7 illustrates a flowchart of an example method 700 for improving session reliability for a redirected mass storage device. Method 700 can be implemented by virtual disk enumerator 260.

Method 700 includes an act 701 of receiving, from an agent that executes on the server, a device removal notification that identifies a mass storage device that had been redirected to the server over a remote session but that has been disconnected. For example, virtual disk enumerator 260 (or reliability component 260c of virtual disk enumerator 260) can receive device removal notification 310 when remote session 301 is disconnected.

Method 700 includes an act 702 of instructing a port driver that executes on the server to pause any I/O requests pertaining to the mass storage device. For example, pause device request 311 can be sent to storport driver 260b.

Method 700 includes an act 703 of waiting for a specified amount of time to determine whether the mass storage device has been reconnected. For example, virtual disk enumerator 260 can delay the device removal process for a session reconnection time period or for another (e.g., a shorter) time period.

Method 700 includes an act 704 of, upon determining that the mass storage device has been reconnected prior to the specified amount of time elapsing, instructing the port driver to resume any I/O requests pertaining to the mass storage device, whereas, upon determining that the mass storage device has not been reconnected prior to the specified amount of time elapsing, commencing a device removal process to remove the mass storage device from the server. For example, virtual disk enumerator 260 can determine whether device connect notification 312 is received prior to a session reconnection time period elapsing. If so, virtual disk enumerator 260 can send resume device request 313 to storport driver 260b. Otherwise, virtual disk enumerator 260 can commence the device removal process to remove virtual mass storage device 290 from server 104.

FIG. 8 illustrates a flowchart of an example method 800 for improving session reliability for a redirected mass storage device. Method 800 can be implemented by virtual disk enumerator 260.

Method 800 includes an act 801 of receiving, from an agent that executes on the server, one or more device removal notifications that each identify a mass storage device that had been redirected to the server over a remote session but that has been disconnected, at least one of the one or more device removal notifications including an indication that a server link is down. For example, virtual disk enumerator 260 can receive device removal notifications 510a-510c.

Method 800 includes an act 802 of instructing a port driver that executes on the server to pause all I/O requests. For example, virtual disk enumerator 260 can send pause I/O request 511 to storport driver 260b.

Method 800 includes an act 803 of waiting for a specified amount of time to determine whether the server link has been reestablished such that: upon determining that the link has been reestablished prior to the specified amount of time elapsing, the virtual disk enumerator: identifies any disconnected mass storage device that has not been reconnected and commences a device removal process to remove each identified mass storage device from the server including to cause any I/O requests pertaining to an identified mass storage device to be completed with an error status; and instructs the port driver to resume the paused I/O requests; and upon determining that the link has not been reestablished prior to the specified amount of time elapsing, the virtual disk enumerator commences a device removal process to remove each of the disconnected mass storage devices. For example, if the server's link is not restored during the specified amount of time, virtual disk enumerator 260 can commence a device removal process to remove all of virtual mass storage devices 290a-290c from server 104. In contrast, if the link is restored, virtual disk enumerator 260 can identify which disconnected devices have not been reconnected and remove them and then resume all I/O.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a virtual disk enumerator that executes on a server in a virtual desktop infrastructure environment, for improving session reliability for a redirected mass storage device, the method comprising:
receiving, from an agent that executes on the server, a device removal notification that identifies a mass storage device that had been redirected to the server over a remote session but that has been disconnected;
instructing a port driver that executes on the server to pause any I/O requests pertaining to the mass storage device;
waiting for a specified amount of time to determine whether the mass storage device has been reconnected; and
upon determining that the mass storage device has been reconnected prior to the specified amount of time elapsing, instructing the port driver to resume any I/O requests pertaining to the mass storage device, whereas, upon determining that the mass storage device has not been reconnected prior to the specified amount of time elapsing, commencing a device removal process to remove the mass storage device from the server.

2. The method of claim 1, wherein instructing a port driver that executes on the server to pause any I/O requests pertaining to the mass storage device comprises calling the StorPortPauseDevice( ) routine with a SCSI Bus Id, Target Id, and LUN of the mass storage device as input parameters.

3. The method of claim 2, wherein instructing the port driver to resume any I/O requests pertaining to the mass storage device comprises calling the StorPortResumeDevice( ) routine with the SCSI Bus Id, Target Id, and LUN of the mass storage device as input parameters.

4. The method of claim 1, wherein the specified amount of time comprises a session reconnection time period during which the agent attempts to restore a disconnected remote session.

5. The method of claim 1, wherein determining that the mass storage device has been reconnected prior to the specified amount of time elapsing comprises:
receiving a device connect notification that includes one or more of a disk serial number, vendor id, product id, or disk size; and
comparing one or more of the disk serial number, vendor id, product id, or disk size to one or more of a stored disk serial number, vendor id, product id, or disk size.

6. The method of claim 5, wherein the device connect notification also includes a session identifier over which the mass storage device has been reconnected, and wherein determining that the mass storage device has been reconnected prior to the specified amount of time elapsing further comprises comparing the session identifier included in the device connect notification with a stored session identifier that is associated with the stored disk serial number, vendor id, product id, or disk size.

7. The method of claim 5, wherein waiting for a specified amount of time comprises maintaining a timer, and wherein the stored disk serial number, vendor id, product id, or disk size are stored in association with the timer.

8. The method of claim 1, wherein commencing a device removal process to remove the mass storage device from the server includes causing any I/O requests pertaining to the mass storage device to be completed with an error status.

9. The method of claim 1, wherein the port driver is a storport driver.

10. A method, implemented by a virtual disk enumerator that executes on a server in a virtual desktop infrastructure environment, for improving session reliability for a redirected mass storage device, the method comprising:
receiving, from an agent that executes on the server, one or more device removal notifications that each identify a mass storage device that had been redirected to the server over a remote session but that has been disconnected, at least one of the one or more device removal notifications including an indication that a server link is down;
instructing a port driver that executes on the server to pause all I/O requests;
waiting for a specified amount of time to determine whether the server link has been reestablished such that:
upon determining that the server link has been reestablished prior to the specified amount of time elapsing, the virtual disk enumerator:
identifies any disconnected mass storage device that has not been reconnected and commences a device removal process to remove each identified mass storage device from the server including to cause any I/O
requests pertaining to an identified mass storage device to be completed with an error status; and
instructs the port driver to resume the paused I/O requests; and
upon determining that the link has not been reestablished prior to the specified amount of time elapsing, the virtual disk enumerator commences a device removal process to remove each of the disconnected mass storage devices.

11. The method of claim 10, wherein instructing a port driver that executes on the server to pause all I/O requests comprises calling the StorPortNotification( ) routine with "LinkDown" as the value of the NotificationType input parameter.

12. The method of claim 11, wherein instructing the port driver to resume the paused I/O requests comprises calling the StorPortNotification( ) routine with "LinkUp" as the value of the NotificationType input parameter.

13. The method of claim 10, wherein the specified amount of time comprises a session reconnection time period during which the agent attempts to restore a disconnected remote session.

14. The method of claim 10, wherein identifying any disconnected mass storage device that has not been reconnected comprises determining whether a device connect notification that includes one or more of a disk serial number, vendor id, product id, or disk size of the disconnected mass storage device has been received during the specified amount of time.

15. The method of claim 14, wherein determining whether a device connect notification that includes one or more of a disk serial number, vendor id, product id, or disk size of the disconnected mass storage device has been received during the specified amount of time comprises comparing a disk serial number included in one or more device connect notifications received during the specified amount of time to a disk serial number that was stored to represent the disconnected mass storage devices while the disconnected mass storage device was redirected.

16. The method of claim 10, wherein a disconnected mass storage device is determined to have been reconnected when a device connect notification is received that contains a disk serial number that matches a disk serial number of the disconnected mass storage device.

17. The method of claim 16, wherein a disconnected mass storage device is determined to have been reconnected when a device connect notification is received that also contains a session identifier that matches a session identifier stored in association with the disk serial number of the disconnected mass storage device.

18. A virtual desktop infrastructure server comprising:
an agent that is configured to establish remote sessions with client devices including to implement redirection of mass storage devices over the remote sessions; and
a virtual disk enumerator that is configured to delay a device removal process when the virtual disk enumerator receives a device removal notification from the agent by performing the following:
upon receiving a device removal notification in response to a redirected mass storage device being disconnected from the server, notifying a port driver to pause I/O requests;
waiting a specified period of time to allow the disconnected mass storage device to be reconnected; and
upon determining that the disconnected mass storage device has been reconnected during the specified amount of time, instructing the port driver to resume the paused I/O requests.

19. The virtual desktop infrastructure server of claim 18, wherein notifying the port driver to pause I/O requests comprises one of:
notifying the port driver to pause only I/O requests pertaining to the disconnected mass storage device; or
notifying the port driver to pause all I/O requests when it is determined that the device removal notification indicates that the disconnected mass storage device was disconnected due to a server-side issue.

20. The virtual desktop infrastructure server of claim 19, wherein when the port driver is notified to pause only I/O requests pertaining to the disconnected mass storage device, instructing the port driver to resume the paused I/O requests comprises instructing the port driver to resume I/O requests pertaining to the disconnected mass storage device, and when the port driver is notified to pause all I/O requests, instructing the port driver to resume the paused I/O requests comprises instructing the port driver to resume all I/O requests.

* * * * *